R. L. HOLLIDAY.
PAINT SCREENING APPARATUS.
APPLICATION FILED FEB. 3, 1911.
1,012,134.
Patented Dec. 19, 1911.
3 SHEETS—SHEET 3.
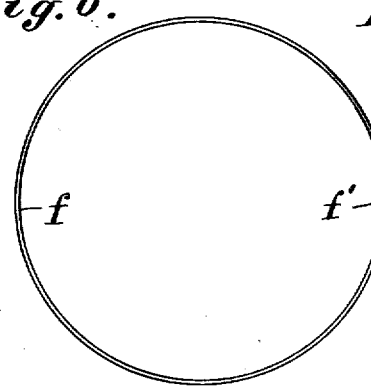
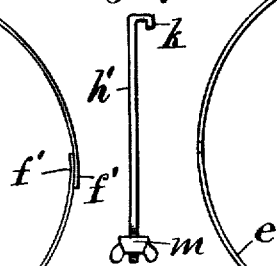
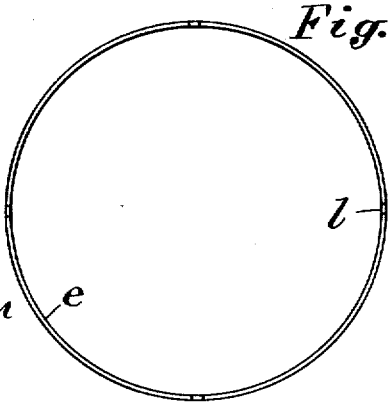
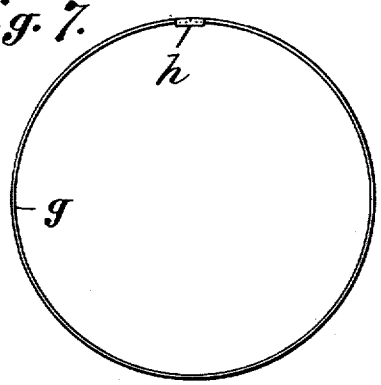
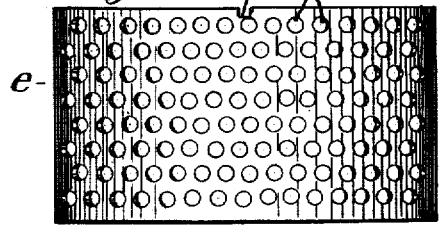
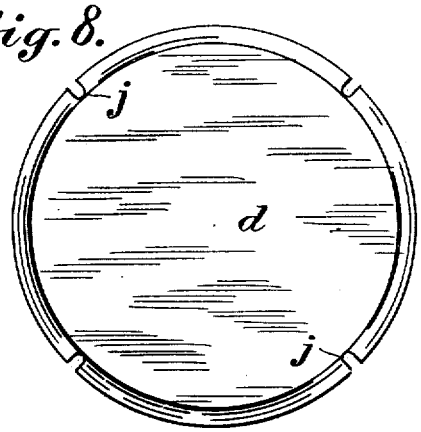
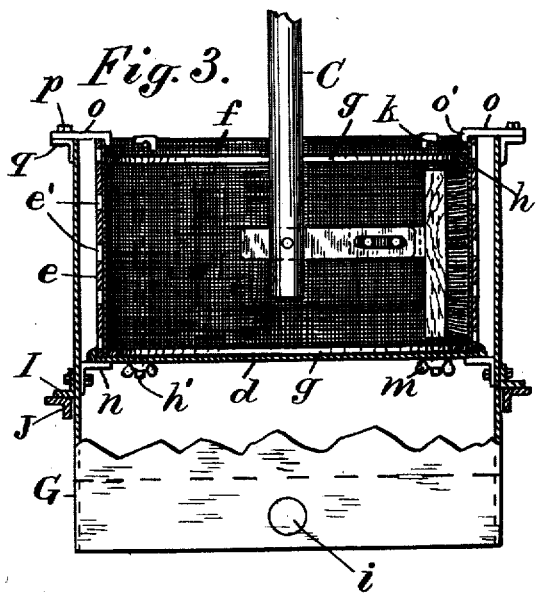
Witnesses
L. Lee.
J. Walter Rosenbaum
Inventor
Robert L. Holliday, per
Thomas L. Crane, Atty.

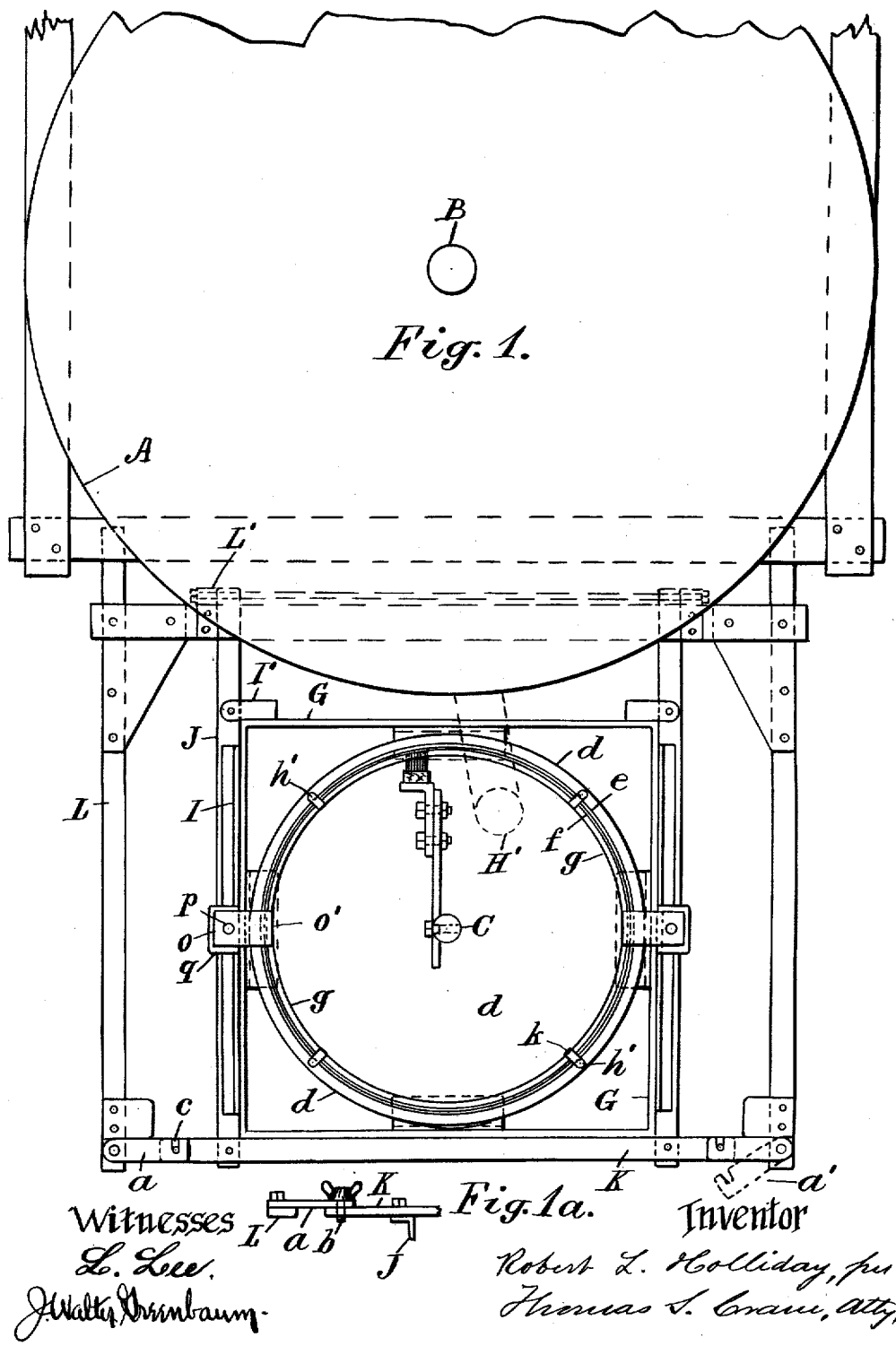

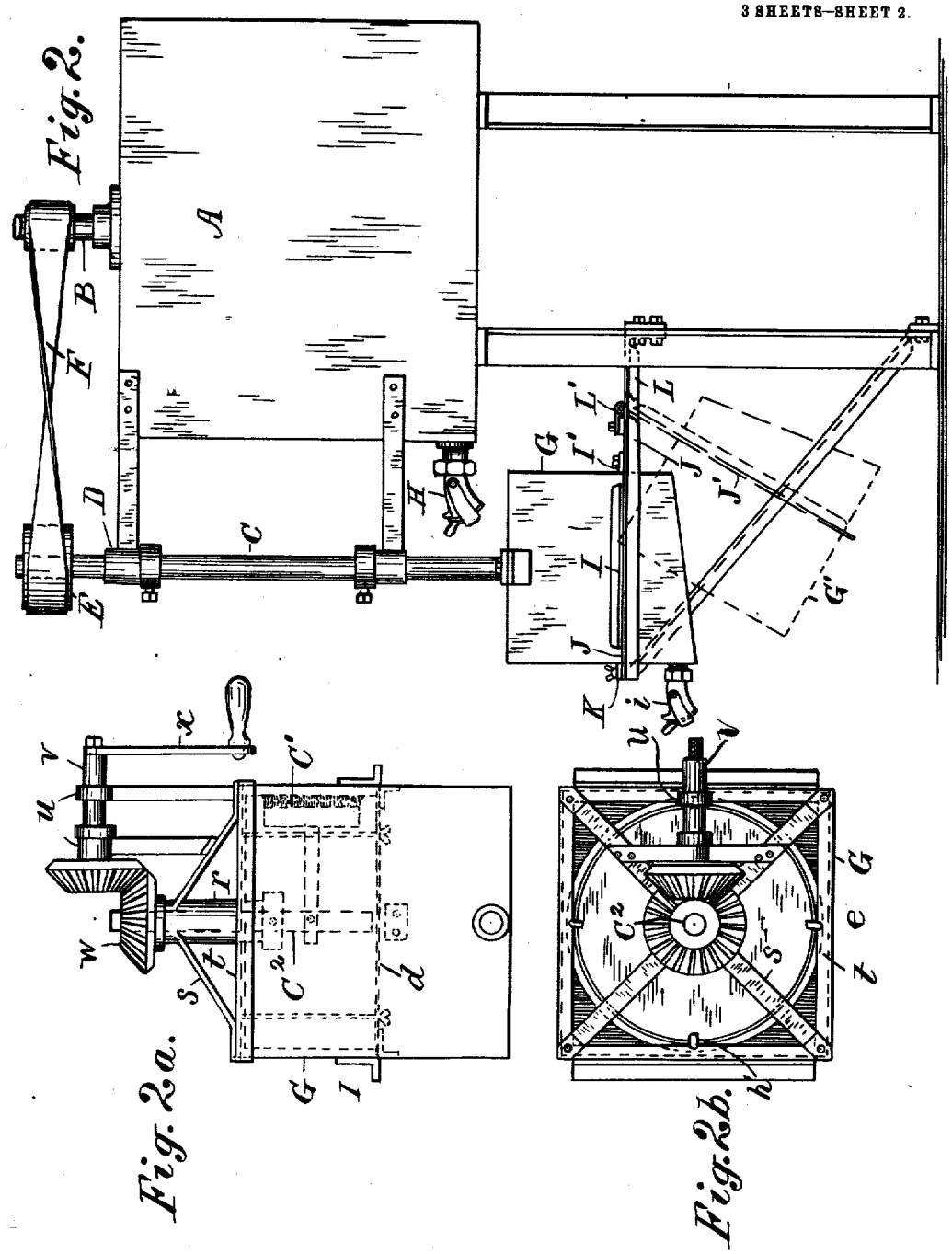

UNITED STATES PATENT OFFICE.

ROBERT L. HOLLIDAY, OF NEW BRIGHTON, NEW YORK.

PAINT-SCREENING APPARATUS.

1,012,134.  Specification of Letters Patent.  Patented Dec. 19, 1911.

Application filed February 3, 1911. Serial No. 606,286.

*To all whom it may concern:*

Be it known that I, ROBERT L. HOLLIDAY, a citizen of the United States, residing at York avenue and The Terrace, New Brighton, Staten Island, New York, have invented certain new and useful Improvements in Paint-Screening Apparatus, fully described and represented in the following specification and the accompanying drawings, forming a part of the same.

This invention relates to means for straining such substances as paint, which may be supplied continuously to the straining device during its operation and the supply cut off when it is necessary to clean out the sediment from the straining device.

The straining device claimed herein is of cylindrical shape, and requires a brush to be rotated or carried around within its cylindrical surface to clean the sediment therefrom and facilitate the passage of the liquid through its holes; and the constructive features are independent of the means for operating the spindle which rotates the brush. As such spindle may, therefore, be operated either by hand or by power, both constructions are illustrated herein.

The invention provides means of connecting to a supporting base a perforated cylindrical shell lined with a wire cloth, these parts forming a vessel into which the liquid to be strained is received; and such straining device is secured removably within a receptacle which receives the strained liquid, and from the bottom of which receptacle it can be drawn at pleasure. The removability of the cylindrical strainer permits it to be taken from the receptacle when it is necessary to remove the sediment accumulated in the strainer; but the invention further provides means of obviating such removal of the straining device from the receptacle, thus saving considerable time when it is necessary to clean out the sediment, and avoiding the disconnection and reconnection of the several parts. Such cleaning of the screening device while in the receptacle is effected by mounting the receptacle upon a hinged frame which holds the straining device, when in operation, in a vertical position around the end of the brush-rotating-shaft; but when the screen requires cleaning, such hinged frame may be tipped downwardly, thus holding the cleaning device in a nearly horizontal position where its open top is fully exposed, and the cleaning can be performed with great facility.

Where the straining device is supplied with paint from a reservoir-tank, the tank is commonly furnished with a stirrer and a vertical stirring-shaft extended upward therefrom, and such shaft may be readily connected by a belt with the brush-spindle. By sustaining such brush-spindle in bearings upon the tank, it is supported in its normal operative position independently of the straining device, and the latter may, therefore, be swung downward for cleaning without interference from the brush.

The details of construction will be understood by reference to the annexed drawing, in which—

Figure 1 is a plan of the strainer connected with a reservoir-tank; Fig. 1ª is an elevation of bars J, K and L; Fig. 2 is a side elevation of the same, with the nearer bar L broken away, and its sloping bracket-leg removed; Fig. 2ª is a side elevation, and Fig. 2ᵇ a plan of the same straining devices, with means for operating the spindle by hand; Fig. 3 is a vertical section of the straining device and the receptacle with an elevation of the brush-spindle and the brush; Fig. 4 is an elevation of the perforated shell, and Fig. 5 is a plan of the same; Fig. 6 is a diagrammatic plan of the wire cloth; Fig. 7 is a plan of one of the hoops for securing the same within the shell, and Fig. 8 is a plan of the base for the shell and wire cloth; Fig. 9 is an elevation of the tie-bolt $h'$.

Figs. 1 and 2 show a reservoir-tank A for the liquid to be strained, with a stirring-shaft B extended from the top, also a brush-spindle C mounted in bearings D upon the tank and having a pulley E upon its top with belt F connecting it to the stirring-shaft B. A receptacle G is shown of square form supported below the cock H upon the front of the tank A and containing the cylindrical straining device. The cock H is omitted from Fig. 1, but its location indicated by dotted lines H'. Such receptacle has angles I upon its opposite sides forming ledges to support it upon a hinged frame having side-bars J and front-bar K. The receptacle is supported by the ledges I, and in operation fitted close to the bar K and held in such position by movable stops I' upon the side-bars J. Brackets L are projected from the legs supporting the tank A and are provided at the front end with swinging buttons $a$ adapted to engage the heads of screws $b$ inserted in the frame-bar K near its opposite ends. The buttons are formed with slots $c$ which clear them from the screws $b$ as soon as the screws are loosened, such clearance being indicated by the dotted lines $a'$ near the right hand end of the bar K. When the hinged frame is secured in a horizontal position by the buttons $a$, the receptacle G holds the straining device centrally beneath the brush-spindle C with the brush inside the wire-cloth, as shown in Fig. 3. When the buttons are released, the hinged frame with the receptacle and straining device can be swung downwardly, as shown in dotted lines J' and G' in Fig. 2, which exposes the open top of the straining device for cleaning out the same.

The screening device is constructed with a base-plate $d$, a cylindrical shell $e$ having numerous perforations $e'$, and a lining of wire-cloth $f$ which is held within the shell by hoops $g$. Such hoops, as shown in Fig. 7 and at the right hand end of Fig. 3, are formed of a wire with the ends coupled together by a sleeve $h$ soldered upon one end of the wire. Such hoops are made to fit within the wire-cloth very tightly, and are inserted by first placing them in an inclined position within the cloth with one edge near the top or bottom of the same, and then pushing the hoop into a horizontal position which locates it either at the top or the bottom of the screen, as shown in Fig. 3. The wire-cloth or net $f$ is, in practice, made with overlapping ends $f'$ indicated only in Fig. 6, the brush being rotated so as to pass smoothly over the lap of the wire-cloth, which is held firmly by the hoops until it is worn sufficiently to need renewal, which the removal of the hooks readily permits. The cylindrical fixtures are held detachably upon the base-plate by tie-bolts $h'$ inserted through holes $j$ near the edges of the base-plate, and provided with hooks $k$ upon their upper ends fitted to notches $l$ upon the upper edges of the shell $e$. The tie-bolts pass upward close to the outside of the shell, thus centering it upon the base-plate, and nuts $m$ upon the lower ends of the bolts serve to clamp the parts together securely and detachably. These parts constitute the screening device, which is supported within the receptacle above its bottom upon ledges $n$ and clamped thereon by plates $o$ secured by bolts $p$ upon two seats $q$ on the top of the receptacle. The plates have hooks $o'$ which fit within the top edge of the screen and center it in the receptacle. The screening device and receptacle thus form a structure which can be set in any required situation to receive the end of a brush-spindle with a brush C' to operate upon the screening cloth, and the application of such structure to a frame below the brush-spindle upon the tank furnishes an operative connection with such brush and tank. The connection of the brush-spindle with the stirring-shaft B rotates the brush continuously within the straining device and clears the pores of the cloth from sediment, which accumulates upon the base-plate $d$, the liquid which exudes through the cloth escaping by the perforation $e'$ in the shell $e$, and runs down the same into the bottom of the receptacle, which may be sloped as shown in Fig. 2, and provided with a gate $i$ to draw the strained liquid therefrom.

The mechanism for rotating the brush-spindle by hand is shown in Figs. 2$^a$ and 2$^b$, the construction of the receptacle and the screening device being identical with that shown in the other figures, and provided with the angles or side-bars I by which it can be supported upon the same frame as the receptacle shown in Fig. 1, or upon any other suitable firm support while straining the liquid. The bearing $r$ for the brush-spindle C$^2$ is attached by a spider $s$ to a skeleton frame $t$ which is supported detachably upon the upper edge of the receptacle. A shaft $v$ is supported in bearings $u$ upon the skeleton frame and spider, and is connected with the brush-spindle by bevel-gears $w$. A hand-crank $x$ upon the shaft $v$ serves to turn the brush-spindle by hand, and the openings within the skeleton frame $t$ permit the liquid to flow from a supply cock into the screening device. The weight of the brush-spindle and its attached parts suffices to hold the brush in the proper position when in operation; but the skeleton frame with the brush-spindle and its gearing can be lifted from the receptacle whenever it is desired to clean out the screening device. If the receptacle be supported upon a hinged frame, it can be tipped downward after the skeleton frame and gearing have been removed, and the screen thus cleaned out without removing it from the receptacle. The suspension of the brush-spindle and brush permits the receptacle to be placed beneath the same or removed therefrom without having to detach any connecting parts, as the brush-spindle has no bearing in the bottom of the screen and is not in any way connected to the receptacle. Such facility for separating the parts permits the frequent cleaning of the receptacle and brush, which greatly promotes the efficient operation of the apparatus.

Having thus set forth the nature of the invention what is claimed herein is:

1. In a strainer, the combination, with a receptacle having a cylindrical strainer supported within the same above its bottom, of a spindle sustained in bearings above the receptacle and having a brush upon its lower end adapted to sweep the interior of the strainer and means for holding the brush and strainer separately in an operative relation to one another.

2. A straining device, comprising a base-plate, a cylindrical perforated shell supported upon the same, bolts extended upward from the base-plate with hooks upon the top engaging the edge of the shell, a wire net fitted within such shell, and hoops crowded within the net to hold it within the shell.

3. In a strainer, the combination, with a straining device having a cylindrical base-plate with a circular perforated shell secured thereto and a wire net held detachably within the shell, of a rectangular receptacle having ledges to support the straining device therein and clamps extended from the top of the receptacle over the top of the shell to center the shell and hold it within the receptacle.

4. In a paint strainer, the combination, with a reservoir and a supply cock, of a hinged frame jointed below the same, a straining appliance with open top secured upon the hinged frame, a brush with spindle for carrying the same projected into the open top of the strainer, means for supporting the hinged frame to hold the straining appliance in an operative position in relation to the brush and means for releasing the hinged frame to tip the straining appliance downward for cleaning.

5. In a strainer, the combination, with a reservoir and a supply cock, of a hinged frame jointed below the same with parallel side-bars, a straining appliance with open top, and a receptacle having ledges to rest upon said side-bars, a brush with spindle for carrying the same projected into the open top of the strainer, and means for holding the hinged frame with the strainer in an operative relation to the brush.

6. In a strainer, the combination, with a reservoir and a supply cock, of a bracket-frame supported below the same and provided with movable buttons at its front corners, a hinged frame jointed to the rear of the bracket-frame and having screws at its front corners to detachably engage the said buttons, and a straining device secured upon the said hinged frame, by which construction it may be held vertically when operating and tipped downwardly when required for cleaning.

7. In a strainer, the combination, with a reservoir-tank having an upright stirring-shaft therein and a cock upon one side, of a straining device with open top supported below the said cock, bearings upon the front of the tank with a brush-spindle mounted therein, a belt connecting the stirring-shaft with the brush-spindle, and a brush upon the lower end of the brush-spindle arranged to operate within the straining device.

8. In a paint strainer, the combination, with a reservoir-tank having an upright stirring-shaft therein and a cock upon one side, of a hinged frame jointed below the said cock, a straining device having open top supported detachably upon the hinged frame, bearings upon the front of the tank with a brush-spindle mounted therein, a belt connecting the stirring-shaft with the brush-spindle, a brush upon the lower end of the spindle adapted to operate within the stirring device, and means for tipping the hinged frame downward with the stirring-device for cleaning out said device.

In testimony whereof I have hereunto set my hand in the presence of two subscribing witnesses.

ROBERT L. HOLLIDAY.

Witnesses:
L. LEE,
JAMES WALTER GREENBAUM.

---

Copies of this patent may be obtained for five cents each, by addressing the "Commissioner of Patents, Washington, D. C."